United States Patent [19]

Feinberg

[11] Patent Number: 4,500,855
[45] Date of Patent: Feb. 19, 1985

[54] PHASE CONJUGATION USING INTERNAL REFLECTION

[75] Inventor: Jack Feinberg, Manhattan Beach, Calif.

[73] Assignee: University of Southern California, Los Angeles, Calif.

[21] Appl. No.: 387,068

[22] Filed: Jun. 10, 1982

[51] Int. Cl.³ .................. H01S 3/098; H01S 3/23; H01S 3/30
[52] U.S. Cl. .................. 332/7.51; 330/4.3; 307/425; 372/21
[58] Field of Search .............. 330/4.3, 4.5; 332/7.51; 307/425; 372/4, 19, 21, 33

[56] References Cited

U.S. PATENT DOCUMENTS

| | | | |
|---|---|---|---|
| 4,005,935 | 2/1977 | Wang | 332/7.51 |
| 4,145,671 | 3/1979 | Hellwarth | |
| 4,220,928 | 9/1980 | Bloom et al. | 372/21 |
| 4,233,569 | 11/1980 | Liu | 372/21 |
| 4,233,571 | 11/1980 | Wang et al. | 372/21 |
| 4,321,550 | 3/1982 | Evtuhov | 330/4.3 |
| 4,344,042 | 8/1982 | Hon | 330/4.3 |

OTHER PUBLICATIONS

Feinberg et al., "Photorefractive Effects and Light-Induced Charge Migration in Barium Titanate", *J. Appl. Phys.* 51 (3), Mar. 1980.

Feinberg et al., "Phase-Conjugating Mirror with Continuous-Wave Gain", *Optics Letters*, vol. 5, No. 12, Dec. 1980.

Lam et al., "Photorefractive-Index Gratings Formed by Nanosecond Optical Pulses in $BaTiO_3$" *Optics Letters*, vol. 6, No. 10, Oct. 1981.

White et al., "Coherent Oscillation by Self-Induced Gratings in the Photorefractive Crystal $BaTiO_3$", *Appl. Phys. Lett.* 40 (6), 3/15/82.

Feinberg et al., "Asymmetric Self-Defocusing of an Optical Beam from the Photorefractive Effect", *J. Opt. Soc. Am.*, vol. 72, Jan. 1982.

*Primary Examiner*—Nelson Moskowitz
*Attorney, Agent, or Firm*—Nilsson, Robbins, Dalgarn, Berliner Carson & Wurst

[57] ABSTRACT

An apparatus and method of producing a phase conjugate replica of a light beam involves internal reflection of the beam within a body of mixing material which lacks inversion symmetry. The orientation of the body relative to the incoming beam is adjusted such that at least one auxiliary beam splits off from the incoming beam, is internally reflected at least twice by the surface of the material and returns to the incoming beam within the material for scattering as an oppositely directed phase conjugate replica thereof.

21 Claims, 7 Drawing Figures

PHASE CONJUGATION USING INTERNAL REFLECTION

BACKGROUND OF THE INVENTION

This invention relates generally to the optical art and, more particularly, to a method and apparatus for producing a phase conjugate replica of a light wave.

For any light wave propagating through a medium there can exist, in principle, a time-reversed replication of that wave. Thus, an appropriately patterned but irregular wave front can travel through a light-scattering medium and emerge as a uniform wave front, provided it is a replica, reversed in time, of a wave that was originally deformed by the same medium. Such a time reversed wave front is generally referred to as a phase conjugate replica of the original wave.

It is well known that phase conjugate replicas of light waves can be generated by nonlinear effects in an irradiated medium. For example, nearly time-reversed waves have been obtained by stimulated Brillouin scattering of laser beams of high optical intensity. Phase conjugation has also been obtained using the photorefractive effect in selected materials. In the photorefractive effect, it is commonly believed that charges (of unknown origin) migrate in the presence of light from regions of high optical intensity to regions of low optical intensity, eventually reaching a static charge distribution. This charge distribution creates a strong static electric field which alters the index of refraction of the material by the first order electro-optic (Pockels) effect. When two light beams, (1) and (2), interact within a nonlinear material, a periodic modulation of the refractive index of the material is obtained. A "reading" beam directed oppositely to the beam (2) can be scattered from the refractive index pattern, also called a "grating", to create an output beam opposite in direction to the beam (1). Under appropriate conditions, the output beam is the phase conjugate replica of beam (1). This process is known as "four-wave mixing" and has been performed with such nonlinear materials as sodium vapor and liquid carbon disulfide. The process is described in U.S. Pat. No. 4,145,671 to Hellwarth.

Phase conjugation by four-wave mixing has been performed using single-domain crystalline barium titanate ($BaTiO_3$) as the nonlinear mixing material, as described in the following publications: Feinberg et al., "Photorefractive Effects and Light-Induced Charge Migration in Barium Titanate", *J. Appl. Phys.* 51(3), March 1980; Feinberg et al., "Phase-Conjugating Mirror With Continuous-Wave Gain", *Optics Letters*, Vol. 5, No. 12, December 1980; and Lam et al. "Photorefractive-Index Gratings Formed by Nanosecond Optical Pulses in $BaTiO_3$" *Optics Letters*, Vol. 6, No. 10, October 1981. However, these procedures require external pumping of the $BaTiO_3$ by counterpropagating laser beams in the same manner as earlier four-wave conjugators.

$BaTiO_3$ has been used in a self-pumped phase conjugator, as described in White et al., "Coherent Oscillation by Self-Induced Gratings in the Photorefractive Crystal $BaTiO_3$", *Appl. Phys. Lett.* 40(6), Mar. 15, 1982. In the White device, part of the incoming beam is deflected for oscillation between a pair of opposed mirrors. The oscillating beams correspond roughly to the external pumping beams of four-wave mixing, producing a phase conjugate beam which has approximately 10 percent of the intensity of the incoming beam. Although this arrangement does not require external pumping, the two external mirrors make it relatively bulky and restrict the geometric configurations in which it can be used. Alignment of the mirrors is also critical and the light path outside the mixing material involves substantial reflection and absorption losses. A further disadvantage of a phase conjugator using the principles disclosed by White is a relatively long optical path. The physics of the interaction require that the oscillating light beam be reasonably coherent with the input beam. The long light path of White thus effectively limits the arrangement to use only with light having a relatively long coherence length, such as substantially monochromatic laser light. If light having a shorter coherence length were used, it probably would not interact in the desired manner.

Therefore, it is desirable in many applications to provide a compact and versatile apparatus for phase conjugation.

SUMMARY OF THE INVENTION

The present invention comprises a method and apparatus of producing a phase conjugate replica of an incoming light beam using a body of mixing material which lacks inversion symmetry and has a substantial optical coupling strength. The incoming beam is directed into the mixing material and the orientation of the mixing material is adjusted relative to the incoming beam such that at least one auxiliary beam splits off from the incoming beam within the material, is internally reflected at least twice by the surface of the material and returns to the incoming beam within the material for scattering as a counterpropagating phase conjugate replica thereof. In a preferred embodiment, the incoming beam has a coherence length at least as long as the path of the auxiliary beam within the material, and the body of mixing material is secured in the proper orientation following the adjustment step. The body of mixing material is preferably a right cylindrical body having a preselected axis, with the incoming and auxiliary beams directed along a plane perpendicular to the axis. The body of mixing material may also have a substantially rectangular transverse cross section defining four corners, the internal reflection taking place adjacent to one of the corners.

The present invention provides a compact and self-sufficient phase conjugator which does not require external pumping or external mirrors. Because the oscillating light beam remains within the material from the time of its creation to the time that it is returned to the incoming beam, it does not suffer the reflection loss that it would if it had to pass in and out of the material. The device is therefore highly efficient, yielding a phase conjugate replica having as much as 60 percent of the intensity of the incoming beam.

It is possible to reflect the auxiliary light beam of the present invention from a number of different surfaces of the body, providing a wide range of directions of incoming light which give rise to a phase conjugate replica. In the case of a right cylindrical body having a rectangular cross section, the auxiliary beam can be reflected from different interior corners of the body, depending upon the coupling strength, coupling direction, and the direction of the optical axis of the mixing material. Once the permissible directions of incoming light are determined for a particular body, they are not subject to change in the normal course of use.

The path of the auxiliary light beam of the present invention is also relatively short from the time that it splits off from the incoming beam to the time that it rejoins the incoming beam, enabling the apparatus to operate in response to light from a wide variety of sources. The only limitation is that the light have a coherence length at least as long as the path of the auxiliary beam. The present invention can therefore be used to reflect light which is not normally considered monochromatic, such as light from sodium or mercury vapor lamps.

The characteristics of the phase conjugator of the present invention make it ideal for use in a variety of circumstances. For example, one of the mirrors of a conventional laser resonator can be replaced by the device to reform the wave front of a laser beam produced by the resonator, as the beam passes back through a gain medium or other material which has distorted it. In a photolithographic imaging apparatus, a light beam passed through a mask can be reflected by the device of the present invention to correct for divergence caused by diffraction of the light at the mask. Because the conjugator is very compact and is not complicated by the need for pumping beams or external mirrors, distortion can be further limited by providing a very short optical path. The device might also be useful to correct for propogation distortions in optical fiber communications systems and as a self-contained ring laser for laser gyroscopes.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENTS

For the purposes of the following discussion, the term "beam" is used in the general sense to refer to any complex wave form of light, regardless of whether it is well collimated or diverging. The term "mixing material" refers to any material for which light can change the index of refraction or absorption of light by the material.

Figure 1:
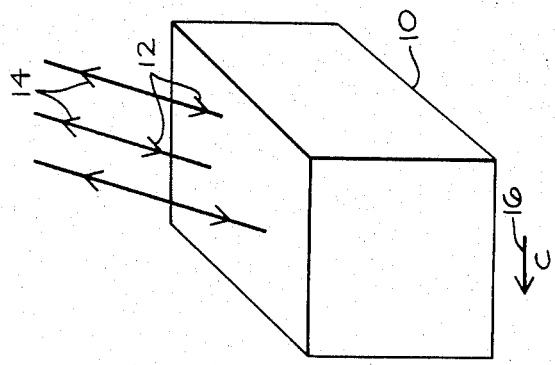
FIG. 1 is a perspective view of a body of mixing material constructed according to the present invention.

Referring now to FIG. 1, there is illustrated a body of mixing material 10 which is exposed to a plurality of beams 12 of incident light to produce oppositely directed phase conjugate replicas 14 of the incident beams. For simplicity, the body of mixing material 10 is illustrated as a right cylindrical body of rectangular cross section having a "c" crystalline axis 16 in the indicated direction. The body 10 is a nonlinear mixing material, such as barium titanate ($BaTiO_3$), which lacks inversion symmetry and has a substantial two-wave coupling strength.

The coupling strength of a mixing material is determined by passing two light beams of the same optical frequency through a thin slice of the material so that they intersect at a given angle, one of the beams initially being much weaker than the other. The intensity of the weaker beam is measured after it intersects the stronger beam. The coupling strength per unit of interaction length is defined to be the change of intensity of the weaker beam divided by its intensity in the absence of the stronger beam, normalized by the distance of the interaction. This coupling strength will, in general, depend on the intersection angle and the orientation of the mixing material with respect to the two beams. In the context of a right cylindrical body of rectangular cross-section, such as the body 10 described above, the peak coupling strength must be at least approximately one per millimeter.

Figure 2:
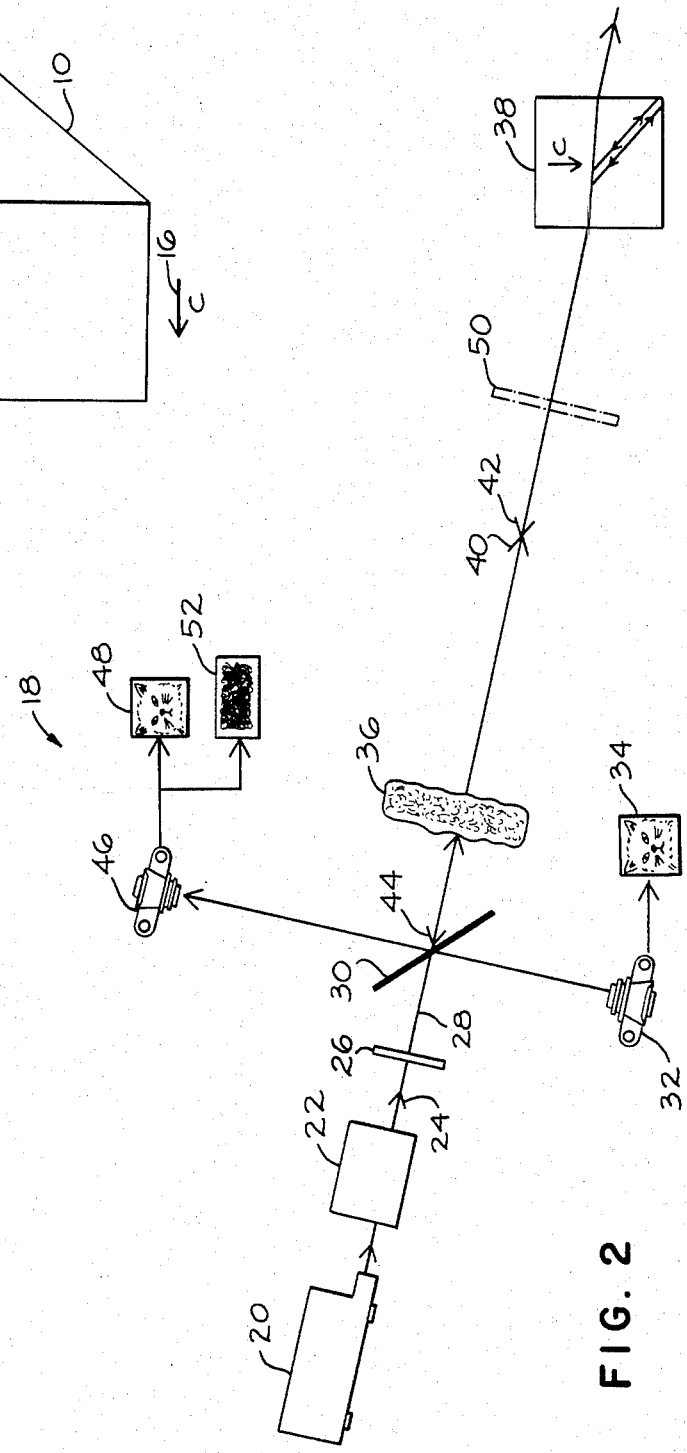
FIG. 2 is a schematic representation of an experimental imaging apparatus constructed according to the present invention.

Referring to FIG. 2, an imaging apparatus 18 is an experimental apparatus having a laser 20 and a beam collimator 22 for passing a collimated light beam 24 through a photographic slide 26. A portion of a beam 28 transmitted by the slide 26 is reflected by a beam splitter 30 to a reference camera 32 for production of a photographic reference image 34 corresponding to the image on the slide. The remainder of the beam 28 passes through the beam splitter 30 and an aberrator 36 to enter a body 38 of nonlinear mixing material. The body 38 is oriented relative to the incoming light in a manner causing a counterpropagating phase conjugate replica 42 to be produced by the body for passage back through the aberrator. The distortion introduced by the aberrator 36 is eliminated when the replica 42 passes back through it, producing a beam 44 which is restored to the initial wave front characteristics of the transmitted beam 28. A portion of the beam 44 is then diverted by the beam splitter 30 to a second camera 46. It has been found that when the body 38 is constructed and arranged according to the present invention, the beam 44 produces a photographic image 48 which is virtually identical to the reference image 34. The body 38 acts to produce a faithful phase conjugate replica of incoming light spanning a variety of wavelengths and impinging upon the body 38 from a wide range of directions.

The effect of the body 38 can be dramatically demonstrated by positioning a conventional mirror 50 (shown in phantom lines) in the path of the incoming beam to reflect the beam before it reaches the body 38. When the reflected beam is recorded by the camera 46, it appears as an unrecognizable image 52. In the conduct of this experiment, the beam splitter 30 is a two-way partially transmissive mirror and the aberrator 36 may be a piece of translucent glass.

Figure 3:
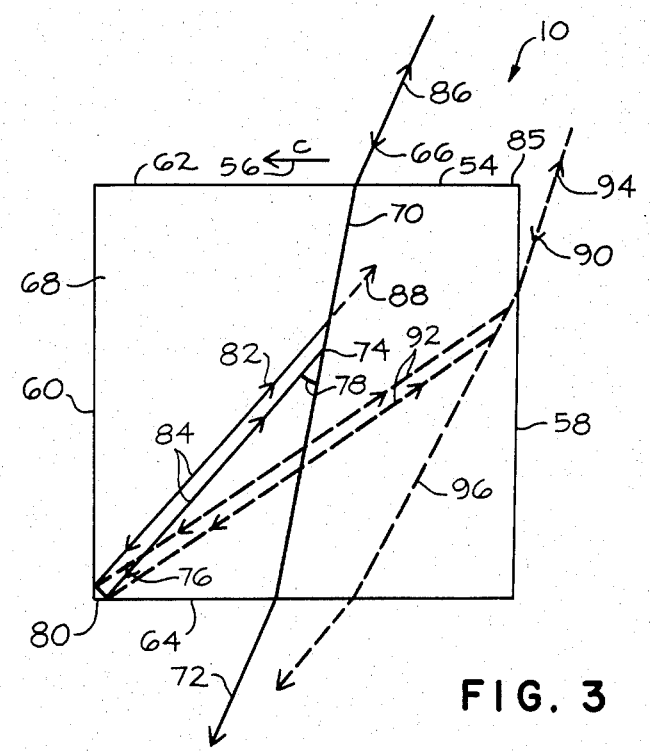
FIG. 3 is a schematic representation of a transverse cross section of the body of FIG. 1, showing various light paths therein.
Figure 4:
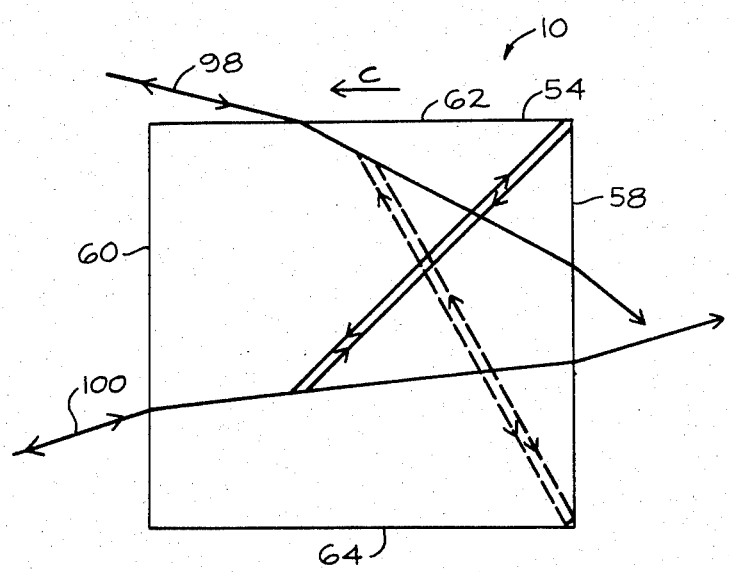
FIG. 4 is a cross section similar to that of FIG. 3, showing other possible light paths.

The operation of the phase conjugator of the present invention can be understood more clearly with reference to FIGS. 3 and 4, which are diagrammatic representations of a transverse rectangular cross section 54 of the body 10. For the purposes of this discussion, the body 10 is assumed to have a "c" axis which is directed from right to left, as shown at 56. The right hand side 58 of the cross section thus corresponds to the "negative c-axis face" and the left hand side 60 corresponds to the "positive c-axis face" of the body 10. Upper and lower sides 62 and 64, respectively, correspond to two of the four adjoining faces of the body.

With reference to FIG. 3, an incoming light beam 66 is incident on the upper face 62 and is refracted within the nonlinear mixing material 68 along a path 70 to the lower face 64. A portion of the incoming beam 66 leaks out the lower face as a transmitted beam 72. At a location 74 within the mixing material, an auxiliary beam 76 is deflected from the beam 70 at an acute angle 78. The auxiliary beam, which can be clearly seen in the body 10 with the naked eye, is deflected to the lower left hand corner 80 of the body where it is reflected twice and returned to the beam 70 along a path 82. The beam 76 is reflected by the corner 80 in the manner of a conventional "corner cube", with the reflected beam returning to the beam 70 at substantially the same location 74. It will be understood that although the auxiliary beam 76 and the return path 82 are shown in the drawings as being spaced apart by a substantial distance, they will actually be very close to one another to form a narrow loop 84. While the loop 84 is formed by a pair of obviously discrete lines for some wavelengths of incoming light, the loop appears almost entirely collapsed into one line for other wavelengths. More than one auxiliary beam may be split off from the beam 70 at the location 74, producing more than one loop 84 and possibly causing light to transverse the loop in two directions. In addition, the loop 84 will sometimes continue to a diagonally opposite corner 85 of the cross section 54, where light is reflected twice and returned to the location 74. This situation is not illustrated in the drawings, but will exist in some geometries of the body 10 and the incoming beam 66.

While not bound by any theory, it is believed that the auxiliary beam 76 is initially split off from the beam 70, at least in part, by asymmetric self-defocusing of the beam 70. This phenomenon is described in Feinberg, "Asymmetric Self-Defocusing of an Optical Beam From the Photorefractive Effect", *J. Opt. Soc. Am.*, Vol. 72, No. 1 January, 1982. A number of such beams are probably deflected from the beam 70 in the direction of the corner 80, at least one of them reaching the corner for return along the path 82. It is believed that the auxiliary beam interacts with the undeflected portion of the beam 70 in the manner known as "two-wave coupling". When the "c" axis is directed as shown at 56 and the material has a positive coupling direction corresponding to positive theoretical charges, the auxiliary beam 76 is preferentially coupled in a manner causing it to grow in intensity relative to the undeflected portion of the beam 70. This interaction is also believed to form a refractive index grating, or "hologram", at the location 74. When the auxiliary beam 76 is returned to the location 74 along the path 82, it is "scattered" by the grating as a phase conjugate replica 86 directed oppositely to the incoming beam 66. The scattering process is comparable in many ways to the phenomenon of four-wave mixing discussed above and involves reading the grating formed at the location 74. At the same time, it is believed that a portion of the auxiliary beam returned along the path 82 continues beyond the location 74, as shown at 88 in FIG. 3. It is believed that the beam 88 couples with the replica 86 to further increase the intensity of the replica.

The phase conjugating process described above depends upon the orientation of the body 10 relative to the incoming beam 66. Although the range of operative orientations is a complex function of a number of factors, including the Pockels coefficient of the mixing material, the indices of refraction of the mixing material and the material surrounding it, the direction and strength of coupling of the mixing material for the wavelength of light being used, and the geometry of the body of mixing material, it can be determined in any case by a relatively simple experimental procedure wherein an incoming beam is directed through the material over a range of directions. The device of the present invention is self-aiming within the range of operative orientations.

The applicant has determined the operative angles of incoming light for a particular right rectangular parallelepiped of crystalline $BaTiO_3$ located in air at room temperature. The dimensions of the body are 5.4 mm×5.6 mm×4.3 mm, and the crystal has been found to have a coupling strength of one per millimeter (corresponding to a theoretical charge density of $3 \times 10^{16}$ positive charges per cubic centimeter) for green light having a wavelength of 5145 angstroms. The coupling strength and direction are determined by the number and type of impurities within the crystal, which impurities are unintentionally included when the crystal is grown. The coupling strength and direction of the particular body can be measured by passing two light beams of the same wavelength through the crystal and observing the strength and the direction of coupling between the two beams, as described in Feinberg et al. *J. Appl. Phys.* 51(3), March 1980, supra.

The angular relationships for the conditions described above can be stated in two rules which are exemplified in FIGS. 3 and 4, respectively. With regard to FIG. 3, the first rule requires that if the incoming beam 66 enter the body 10 along a plane parallel to the cross section 54 and in a direction causing the transmitted portion 72 to exit a face that shares an edge with the negative c-axis face 58. The self-pumped phase conjugating process of the present invention will then occur as long as the portion of the beam within the material makes an acute angle with the positive direction of the c axis. Thus, an incoming beam 90 incident on the negative c-axis face 58 will produce a loop 92 and a phase conjugate replica 94 because it exits the lower face 64 and a portion 96 within the material forms an acute angle with the positive direction 56 of the c axis. The second rule states that any beam put into the crystal in a plane parallel to the cross section 54 and in a direction causing it to exit the negative c-axis face 58 will produce the desired effect. These conditions are satisfied in FIG. 4 by a pair of incident beams 98 and 100. However, the two rules described above hold true only for a material having impurities which produce positive coupling. If the impurities produce negative coupling, each reference to the negative c-axis face of the body must be changed to refer to the positive c-axis face, and the acute angle required by the first rule must be made with the negative direction of the c axis. The coupling effects are exactly opposite in materials having the two different types of impurities.

It may be desirable in some cases to surround the body of mixing material with a liquid or gas having a refractive index greater than the refractive index of air. The critical angles of internal reflection, and thus the permissible directions of light in the material, will then be modified according to well known physical principles. The reflection loss suffered by an incident beam at the entrance face of the material will also be modified.

Figure 5:
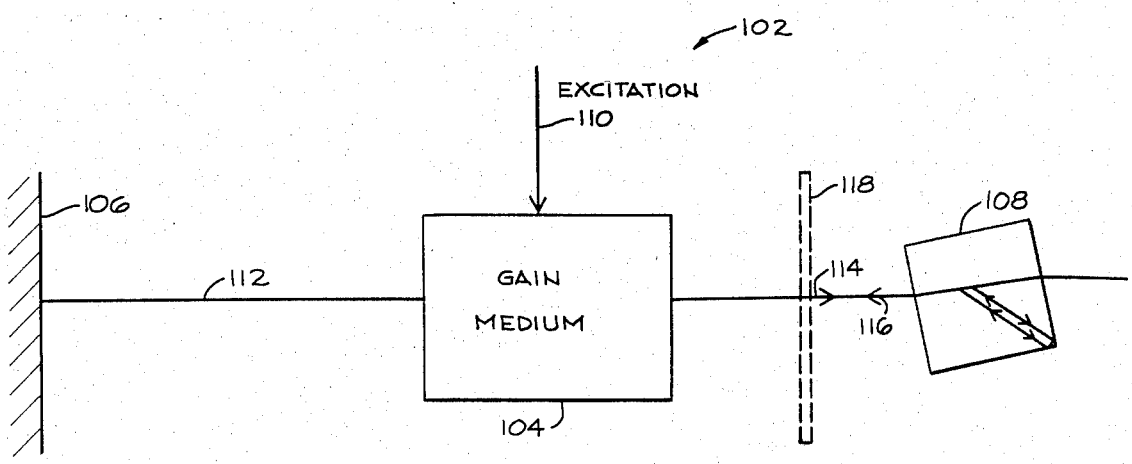
FIG. 5 is a schematic representation of a laser resonator incorporating the teachings of the present invention.

Referring now to FIG. 5, there is illustrated a laser resonator or cavity 102 having a gain medium 104 positioned between a conventional reflective mirror 106 and a body 108 of properly oriented mixing material. The gain medium is provided with a source of excitation 110 to produce an oscillation beam 112 between the mirror 106 and the body 108. The body 108 acts as a phase conjugator transforming an incoming laser beam 114 into a phase conjugate replica 116. Any distortion or aberration of the laser wave front caused by traversing the gain medium from left to right is thus eliminated by passage of the replica 116 oppositely through the gain medium. The result is an oscillation beam 112 having precisely the desired wave front characteristics. The structure of the resonator 102 is particularly advantageous in the context of tunable dye lasers in which the gain medium can have a considerable aberrating effect. Because the replica beam 116 has a somewhat lower intensity than the incoming beam 114, it may be desirable to provide a partially transmissive mirror 118 between the gain medium and the body 108. The mirror 118 preferably reflects a portion of the light incident on it from the gain medium back on itself, maintaining the oscillating beam 112 at a satisfactory level of power despite some loss of efficiency by use of the body 108. It will be noted that although the replica 116 is only approximately 60 percent as high in intensity as the incoming beam 114, the device of the present invention is much more efficient than any other self-pumped conjugator known to applicant. The apparatus of White et al. is only approximately 10 percent efficient.

Figure 6:
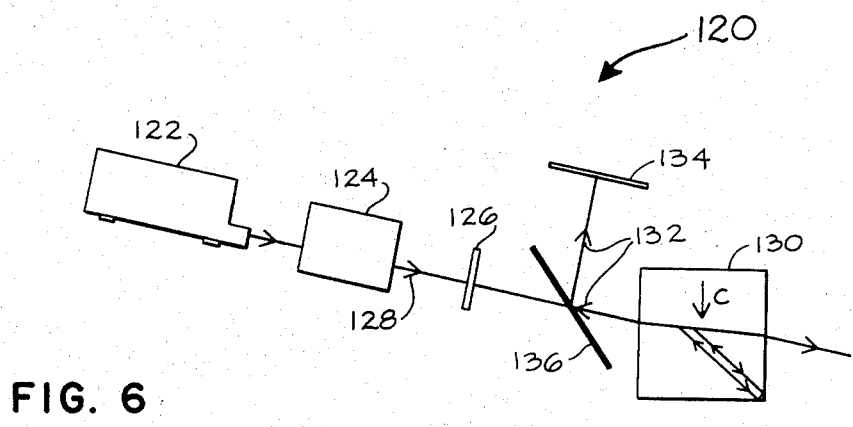
FIG. 6 is a schematic representation of a photolithographic imaging apparatus incorporating the teachings of the present invention.

FIG. 6 illustrates a photolithographic imaging apparatus 120 having a laser 122 directed through a beam collimator 124 for illuminating a light mask 126 with a collimated beam 128. The output of the light mask is applied to a body 130 of nonlinear mixing material which acts as a phase conjugator to "reflect" a replica 132 of the incident beam. The replica is diverted to a work surface 134 by a beam splitter 136 to cast the pattern of the light mask onto the work surface. The work surface will typically be a semiconductor substrate for the manufacture of integrated circuits, requiring a very high pattern resolution. The phase conjugating body 130 is desirable in this context to correct for the diffracting effect of the light mask 126 on the collimated beam 128. The phase conjugate replica 132 has a converging characteristic precisely equal and opposite to the diffracted characteristic of the incident beam, causing the replica 132 to converge back to the image of the light mask 126 over a path equal to the distance between the light mask and the body 130. Optimal imaging occurs when the optical distance from the body 130 to the work surface 134 exactly equals that from the light mask to the body.

In use, the $BaTiO_3$ bodies 10, 38, 108 and 130 must initially be poled in a manner producing an overall "c" crystal axis, eliminating overall inversion symmetry therein. The crystal is most easily poled by exposing it to a voltage in the desired direction. The voltage is applied such that the negative polarity is in the direction of the intended c axis. For many nonlinear mixing materials, including $BaTiO_3$, the body will remain poled indefinitely in the absence of disturbing influences. However, $BaTiO_3$ and other mixing materials have a critical temperature above which they naturally acquire inversion symmetry in the absence of an applied electric field. The lack of inversion symmetry established by poling is lost if the material is raised above its critical temperature. In $BaTiO_3$, this temperature is approximately 130 degrees Celsius.

Figure 7:
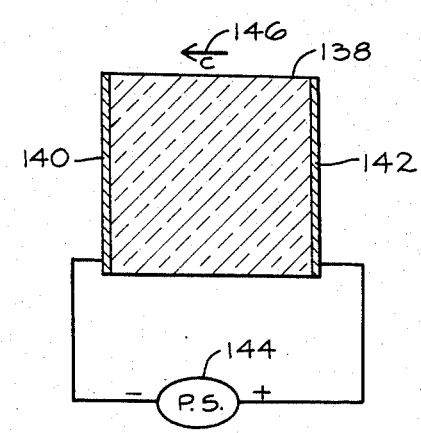
FIG. 7 is a cross sectional view of a variational form of the structure of FIG. 1 wherein an external field is applied to the body of mixing material during operation.

When the operating temperature is above the critical temperature of the mixing material, the material no longer lacks inversion symmetry and the device of the present invention will not operate unless an electric field is continuously applied. An arrangement for performing this function is illustrated in FIG. 7, wherein a body 138 of mixing material is provided with a negative electrode 140 and a positive electrode 142 connected to a power supply 144. Operation of the power supply applies a desired potential across the body, eliminating inversion symmetry within the material and establishing a right-to-left c axis direction 146. In some instances, it may also be desirable to apply an electric field to a body of mixing material which lacks inversion symmetry to increase the reflectivity of the device.

In most cases, the body of mixing material can be poled and positioned within an associated apparatus for functioning indefinitely as a self-pumped phase conjugating mirror. In the laser resonator of FIG. 5, the body 108 will continue to function until the geometry of the resonator is changed or the characteristics of the body are disturbed by outside forces. The same is true regarding the body of mixing material 130 in the imaging apparatus of FIG. 6.

It will be appreciated that a variety of nonlinear mixing materials can be used in the method and apparatus of the present invention. The only requirements are that the materials lack inversion symmetry, either standing alone or when used in conjunction with the power supply of FIG. 7, and that they have a sufficiently high Pockels coefficient. Two materials other than $BaTiO_3$ which have these properties are potassium niobium tantalate ($KTa_{1-x}Nb_xO_3$) and strontium barium niobate ($Sr_{1-x}Ba_xNb_2O_6$). In this context, it is believed that the method of the present invention will operate for both crystalline bodies and liquid crystals.

It will further be appreciated that the present invention is suitable for use with both laser and non-laser light, unlike many of the prior phase conjugating apparatuses. This is possible because the total optical path within the material is very short, permitting the beams to produce a stationary refractive index grating in the material using a non-laser input beam. Specifically, it is believed that the present invention is useful with light from sodium vapor and mercury vapor lamps.

From the above, it can be seen that there has been provided a compact and self-sustaining device for producing a phase conjugate replica of an incoming beam over relatively wide ranges of wavelengths and directions of incident light.

What is claimed is:

1. A method of producing a phase conjugate replica of an incoming light beam using a body of mixing material which lacks inversion symmetry and has an optical coupling strength of at least approximately one per millimeter, comprising the steps of:
   causing the incoming beam to enter the mixing material; and
   adjusting the orientation of the mixing material relative to the incoming beam such that at least one auxiliary beam splits off from the incoming beam within the material, is internally reflected by the surface of the material and returns to the incoming beam within the material for scattering as an oppositely directed phase conjugate replica thereof.

2. The method of claim 1 wherein the auxiliary beam is internally reflected at least twice by the surface of the material before returning to the incoming beam.

3. The method of claim 1 wherein the incoming light has a coherence length at least as long as the path of the auxiliary beam within the material.

4. The method of claim 3 which further comprises the step of securing the body of mixing material in the orientation achieved in the adjustment step.

5. The method of claim 4 in which the body of mixing material is a right cylindrical body having a preselected axis and the beams are directed along a plane perpendicular to the axis.

6. The method of claim 5 in which the body of mixing material has a substantially rectangular transverse cross section defining four corners and the internal reflection takes place adjacent to at least one of the corners.

7. The method of claim 6 wherein the mixing material is crystalline barium titanate.

8. The method of claim 6 wherein the mixing material is crystalline potassium niobium tantalate.

9. The method of claim 6 wherein the mixing material is crystalline strontium barium niobate.

10. The method recited in claim 4 which further comprises the step of applying an external electric field to the material.

11. A method of producing a phase conjugate replica of an incoming light beam using a body of mixing material which lacks inversion symmetry and has an optical coupling strength of at least approximately one per millimeter, comprising the steps of:
  causing the incoming beam to enter the mixing material;
  adjusting the orientation of the mixing material relative to the incoming beam such that at least one auxiliary beam splits off from the incoming beam within the material, is internally reflected by the surface of the material and returns to the incoming beam within the material for scattering as an oppositely directed phase conjugate replica beam thereof;
  passing the replica beam back along at least a portion of the optical path of the incoming beam; and
  diverting at least a portion of the replica beam from said path for use.

12. A method of reducing optical aberrations of a laser beam generated in a laser cavity, comprising:
  disposing a body of mixing material, which lacks inversion symmetry and has an optical coupling strength of at least approximately one per millimeter, within the laser cavity in the path of the laser beam;
  adjusting the orientation of the mixing material relative to the incoming laser beam such that at least one auxiliary beam splits off from the incoming beam within the material, is internally reflected by the surface of the material and returns to the incoming beam within the material for scattering as an oppositely directed phase conjugate replica thereof; and
  securing the body of mixing material in the orientation achieved during adjustment.

13. In a laser apparatus having a gain medium, means for exciting the gain medium and a plurality of means for reflecting a light beam through the gain medium to produce oscillation, the improvement wherein at least one of the reflecting means comprises a body of mixing material which lacks inversion symmetry and has an optical coupling strength of at least approximately one per millimeter, the body being aligned with the light beam such that at least one auxiliary beam splits off from the incoming beam within the material, is internally reflected by the surface of the body and returns to said light beam within the material for scattering as an oppositely directed phase conjugate replica of said light beam.

14. The laser apparatus recited in claim 13 wherein said at least one reflecting means consists essentially of said body of mixing material and means for directing said light beam to the body and directing said replica beam back to the gain medium.

15. In a photolithographic apparatus having means for exposing a mask to substantially collimated light and directing a transmitted primary beam along a preselected path to a work surface, the improvement which comprises:
  a body of mixing material which lacks inversion symmetry and has an optical coupling strength of at least approximately one per millimeter, the body being aligned with the primary beam at a location along the preselected path such that at least one auxiliary beam splits off from the primary beam within the material, is internally reflected by the surface of the body and returns to the primary beam within the material for scattering as an oppositely directed phase conjugate replica beam of the primary beam; and
  means for splitting off at least a portion of the replica beam for selective illumination of the work surface.

16. The apparatus of claim 13 or 15 wherein the mixing material is a right cylindrical body having a preselected axis and the beams are directed along a plane perpendicular to the axis.

17. The apparatus of claim 16 wherein the body of mixing material has a substantially rectangular transverse cross section defining four corners and the internal reflection takes place adjacent at least one of the corners.

18. The apparatus recited in claim 17 wherein the mixing material comprises crystalline barium titanate.

19. The apparatus recited in claim 17 wherein the mixing material comprises crystalline potassium niobium tantalate.

20. The apparatus recited in claim 17 wherein the mixing material comprises crystalline strontium barium niobate.

21. The apparatus recited in claim 13 or 15 which further comprises means for applying an electric field to the material.

* * * * *